US012745708B2

(12) United States Patent
Nir et al.

(10) Patent No.: US 12,745,708 B2
(45) Date of Patent: Sep. 29, 2026

(54) AUTONOMOUS SYSTEM FOR AUTOMATIC PICKING AND BOXING OF FRUITS AND METHOD OF MANEUVERING SAME

(71) Applicant: METOMOTION LTD., Misgav (IL)

(72) Inventors: Adi Nir, Sarid (IL); Mor Baum, Tzippori (IL); Anton Avstreih, Beit Alpha (IL); Adi Cohen, Afula (IL); Dor Lavi, Beit Zaid (IL)

(73) Assignee: METOMOTION LTD., Misgav (IL)

( * ) Notice: Subject to any disclaimer, the term of this patent is extended or adjusted under 35 U.S.C. 154(b) by 398 days.

(21) Appl. No.: 18/289,276

(22) PCT Filed: May 2, 2022

(86) PCT No.: PCT/IL2022/050455

§ 371 (c)(1),
(2) Date: Nov. 2, 2023

(87) PCT Pub. No.: WO2022/234573

PCT Pub. Date: Nov. 10, 2022

(65) Prior Publication Data

US 2024/0237582 A1 Jul. 18, 2024

Related U.S. Application Data

(60) Provisional application No. 63/182,967, filed on May 2, 2021.

(51) Int. Cl.
*G07C 5/00* (2006.01)
*A01D 46/20* (2006.01)
(Continued)

(52) U.S. Cl.
CPC ............ *A01D 46/30* (2013.01); *A01D 46/20* (2013.01)

(58) Field of Classification Search
CPC ................................ A01D 46/30; A01D 46/20
See application file for complete search history.

(56) References Cited

U.S. PATENT DOCUMENTS 5,901,539 A * 5/1999 Sandei .................. A01G 9/143 53/391
12,137,634 B2 * 11/2024 Haldewang .......... G06V 10/751
(Continued)

FOREIGN PATENT DOCUMENTS

CN 109005923 A 12/2018
CN 111567214 A 8/2020
(Continued)

OTHER PUBLICATIONS

PCT International Search Report and Written Opinion for International Application PCT/IL2020/050815, mailed Oct. 31, 2022, 9pp.

*Primary Examiner* — Kito R Robinson
*Assistant Examiner* — Anthony Gabriel Mora
(74) *Attorney, Agent, or Firm* — Oblon, McClelland, Maier & Neustadt, L.L.P.

(57) ABSTRACT

An autonomous system for automatic picking and boxing of fruits is disclosed. The system may include a movable picking unit, comprising: a first movable platform; one or more robotic arms connected to the movable platform; and a fruit conveyor. Each robotic arm may be configured to pick at least one fruit at a time and place the at least one picked fruit on the fruit conveyor. The system may further include: a movable boxing unit, comprising: a second movable platform; a containers gripper; a containers' lift; and a container's conveyor. The container's conveyor may be configured to receive a container from the containers gripper and convey the container to a fruit receiving position, at which the container receives fruits from the fruits' conveyor.

16 Claims, 7 Drawing Sheets

(51) Int. Cl.

| | |
|---|---|
| ***A01D 46/30*** | (2006.01) |
| ***G07C 5/02*** | (2006.01) |
| ***G07C 5/04*** | (2006.01) |
| ***G07C 5/08*** | (2006.01) |

(56) References Cited

U.S. PATENT DOCUMENTS

| | | | | |
|---|---|---|---|---|
| 12,219,899 | B2 * | 2/2025 | Lapalme | B65B 35/16 |
| 12,376,523 | B2 * | 8/2025 | Dondeyne | B25J 15/0266 |
| 2013/0118866 | A1 * | 5/2013 | Henderson | B65G 67/08 198/812 |
| 2020/0281122 | A1 * | 9/2020 | Mor | A01F 15/00 |
| 2020/0369080 | A1 * | 11/2020 | Cmich | A01B 45/02 |
| 2021/0101764 | A1 | 4/2021 | Olshenske et al. | |
| 2022/0009723 | A1 * | 1/2022 | Schuesslburner | B65G 47/715 |
| 2022/0174877 | A1 * | 6/2022 | Requena | A01D 46/30 |
| 2023/0390941 | A1 * | 12/2023 | Opoku | B25J 11/0045 |

FOREIGN PATENT DOCUMENTS

| | | | |
|---|---|---|---|
| DE | 102015111650 | A1 | 1/2017 |
| WO | 2018087546 | A1 | 5/2018 |
| WO | 2022195491 | A1 | 9/2022 |

* cited by examiner

Step 6- stacking second container

AUTONOMOUS SYSTEM FOR AUTOMATIC PICKING AND BOXING OF FRUITS AND METHOD OF MANEUVERING SAME

CROSS REFERENCE

This application is a National Phase of PCT Patent Application No. PCT/IL2022/050455 having International filing date of May 2, 2022, which claims the benefit of priority of U.S. Provisional Patent Application No. 63/182,967, filed on May 2, 2021, the content of which is hereby incorporated by reference in its entirety.

FIELD OF THE INVENTION

The present invention relates generally to automatic picking of fruits. More specifically, the present invention relates to autonomous system for automatic picking and boxing of fruits and method of maneuvering same.

BACKGROUND OF THE INVENTION

Automation is rapidly developing in any field of agriculture. From the old and proven automatic irrigation systems to the newly artificial intelligent (AI) based harvesting system, automatic systems are part of any modern farming.

The growing demand for efficient use of resources, such as land, water, time and manpower, leads farming work to embrace any automatic and also autonomous system that can save any one or all of the listed resources. Automatic and autonomous systems can work 24 hours, 7 days a week all year, without any manual supervision.

Automatic harvesting/picking of fruits is tricky, as the robot performing the work needs to carefully pick each fruit or bunch without damaging the fruits. These AI-based systems are complicated and expensive, and although the robot performing the picking work can also box or pack the picked fruits, it is inefficient. The costly time of the AI-controlled robot is dedicated to picking only and the boxing and packing is conducted later in a packing house. Accordingly, additional work is required for transporting the picked fruits to the packing house for packing/boxing the fruits. These stages, usually involve some manual work and are time-consuming.

Accordingly, there is a need for a fully autonomous and automatic system for both picking and boxing/backing of fruits/bunches, on the field or in the greenhouse.

SUMMARY OF THE INVENTION

Some aspects of the invention may be directed to an autonomous system for automatic picking and boxing of fruits. In some embodiments, the system may include a movable picking unit, comprising: a first movable platform; one or more robotic arms connected to the movable platform; and a fruit conveyor. In some embodiments, each robotic arm may be configured to pick at least one fruit at a time and place the at least one picked fruit on the fruit conveyor. In some embodiments, the system may further include: a movable boxing unit, comprising: a second movable platform; a containers gripper; a containers' lift; and a container's conveyor. In some embodiments, the container's conveyor may be configured to receive a container from the containers gripper and convey the container to a fruit receiving position, at which the container receives fruits from the fruits' conveyor.

In some embodiments, the movable picking unit and the movable boxing unit may be connected via a connector such that a fruit placed on the fruit conveyor will fall into a container positioned at the fruit receiving position. In some embodiments, the first movable platform and the second movable platform may be the same movable platform, and the container's conveyor, and the fruit conveyor are assembled on the platform such that a fruit placed on the fruit conveyor will fall into a container positioned at the fruit receiving position.

In some embodiments, the container's gripper and the container's lift may be held inside an open frame. In some embodiments, the movable boxing unit may further include an empty container entrance shelf located at the upper portion of the open frame.

In some embodiments, the system may further include a controller configured to control at least one of: the first movable platform, the second movable platform, the one or more robotic arms, the fruit conveyor, the container's conveyor and the containers lift. In some embodiments, the system may further include: one or more cameras for capturing one or more images of fruits on plant and wherein the controller is configured to: receive images of fruits; determine one or more fruits to be picked; and control the one or more robotic arms to pick the one or more fruits.

In some embodiments, the system may have a maximum length of 200 cm and maximum height of 200 cm. In some embodiments, the first movable platform and the second movable platform are configured to travel on at least one of: the rails and trails. In some embodiments, the first movable platform and the second movable platform comprises at least one of: railway wheels and wheels.

In some embodiments, the system may further include a power supply trolley electrically connected to at least one of: the picking unit and the boxing unit for providing electricity to components and units of the picking unit and the boxing unit.

Some additional aspects of the invention may include a system for picking fruits comprising: a first movable platform; one or more robotic arms connected to the movable platform; and a fruit conveyor. In some embodiments, each robotic arm may be configured to pick at least one fruit at a time and place the at least one picked fruit on the fruit conveyor. In some embodiments, the first movable platform may include: a platform; at least four wheels; and a steering and driving unit, comprising: a chassis; two wheels pivotally connected to the chassis; at least one driving motor coupled to at least one wheel; a rotating joint pivotally connecting the chassis to the platform; a rotating motor coupled to the rotating joint and configured to rotate the steering and driving unit with respect to the platform; and a securing element for securing the steering and driving unit to the platform at any rotation position.

In some embodiments, the steering and driving unit may be symmetrically located at the middle bottom part of the platform. In some embodiments, each one of the at least four wheels and the two wheels pivotally connected to the chassis may be configured to travel on both a trail and a rail. In some embodiments, each wheel may include a first wheel configured to travel on a trail and a second wheel configured to travel on a rail.

In some embodiments, the system may further include a controller configured to:

(1) drive the system to travel along a trail;

(2) drive the system to travel along a railway; and (3) change the driving direction of the system at a zero turning radius.

In some embodiments, the controller may be configured to control at least one of: control the steering and driving unit to at least one of: the at least one driving motor, the rotating motor and the securing element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
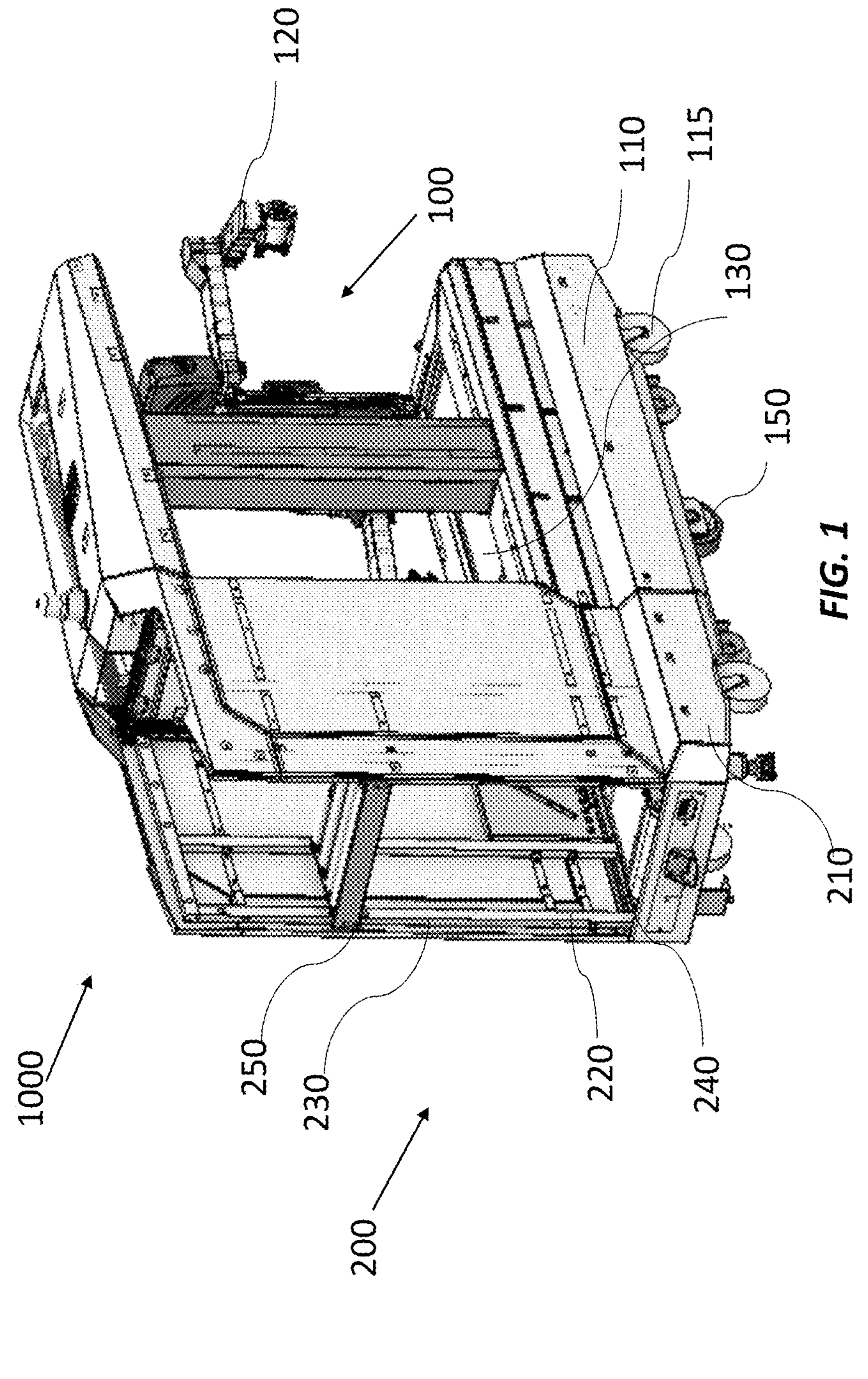
FIG. 1 is an illustration of an autonomous system for automatic picking and boxing of fruits according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Some aspects of the invention may be related to an autonomous system for automatic picking and boxing fruits. Such a system may autonomously maneuver between planted lines, autonomously and automatically pick fruits/bunches, and autonomously and automatically box/pack the fruits/bunches in one or more containers. In some embodiments, the packed fruits may be directly marked, form the field/greenhouse to the grocery store.

Reference is now made to FIG. 1 which is an illustration of an autonomous system for automatic picking and boxing of fruits according to some embodiments of the invention. A system 1000 may be configured to autonomously and automatically pick and pack (e.g., box) fruits in a greenhouse and/or on the field. The fruits may be vines (e.g., tomatoes, grapes, etc.), Cucurbitaceae, and the like. System 1000 may include a movable picking unit 100 configured to pick the fruits and a movable boxing unit 200 configured to pack/box the picked fruits. In some embodiments, system 1000 may further include one or more controllers (e.g., a controller 160 illustrated in FIG. 5) for controlling the controllable components and units of system 1000.

Figure 4:
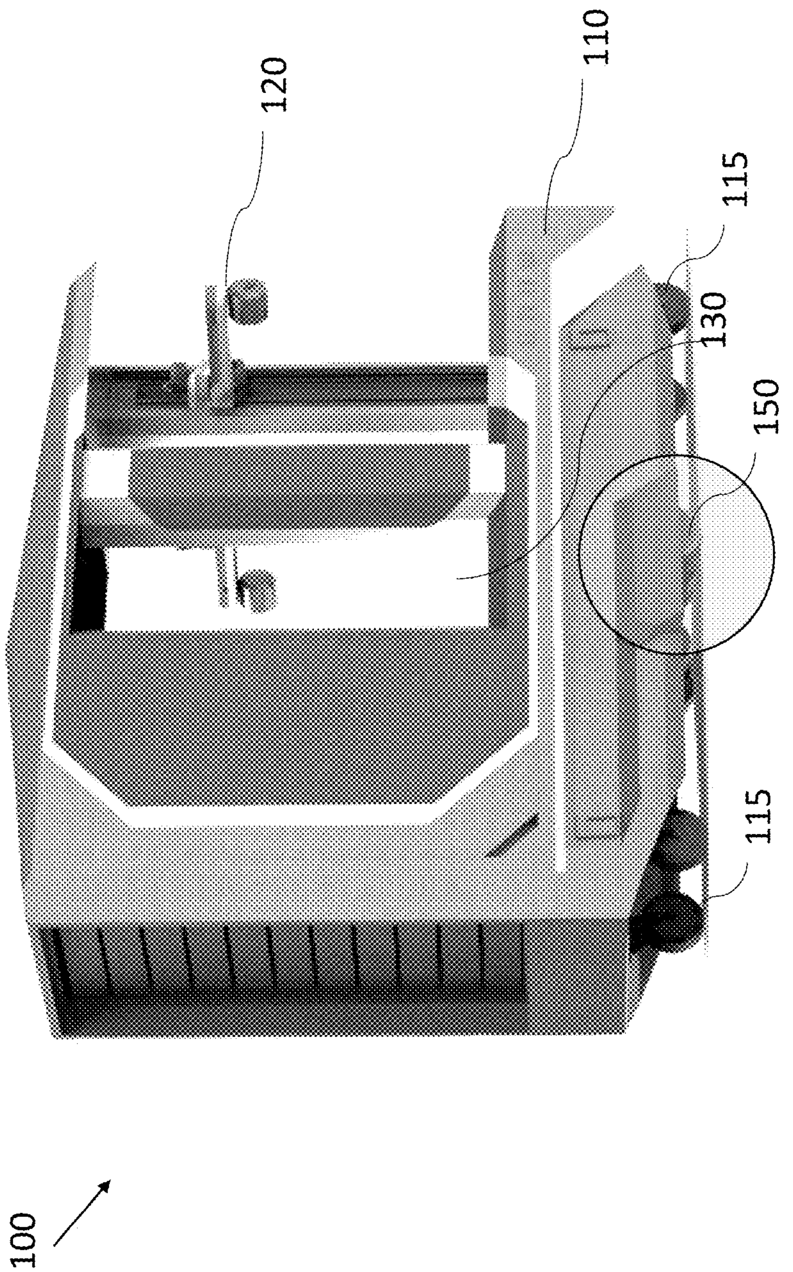
FIG. 4 is an illustration of a system for picking fruits according to some embodiments of the invention.

In some embodiments, movable picking unit 100 may include a first movable platform 110, one or more robotic arms 120 connected to movable platform 110, and a fruit conveyor 130. In some embodiments, movable platform 110 may include at least four wheels 115 (e.g., railway wheels and car wheels) and may be configured to travel on at least one of: rails and trails. Movable platform 110 may further include steering and driving unit 150, discussed in detail with respect to FIGS. 4 and 5.

In some embodiments, one or more robotic arms 120 may be any suitable robotic arms configured to pick a single fruit or a bunch. For example, one or more robotic arms 120 may have at least 5 degrees of freedom. In some embodiments, one or more robotic arms 120 may include a picking tool, for example, a pincer, a cutter, and the like.

In some embodiments, fruit conveyor 130 may include a conveying belt and a rolling unit for rolling the conveying belt. In some embodiments, upon picking fruit or bunch, one or more robotic arms 120 may place the picked fruit or bunch on fruit conveyor 130. In some embodiments, fruit conveyor 130 may be located such that the picked fruit or bunch may travel to be packed/boxed by movable boxing unit 200, as illustrated in FIG. 2.

In some embodiments, movable boxing unit 200 may include a second movable platform 210, a containers' gripper 220, a containers' lift 230 and a container's conveyor 240. In some embodiments, container's conveyor 240 may be configured to receive a container 10 from containers gripper 220 and convey container 10 to a stacking position, as illustrated in FIG. 2 and further in FIGS. 3A-3H.

Figure 2:
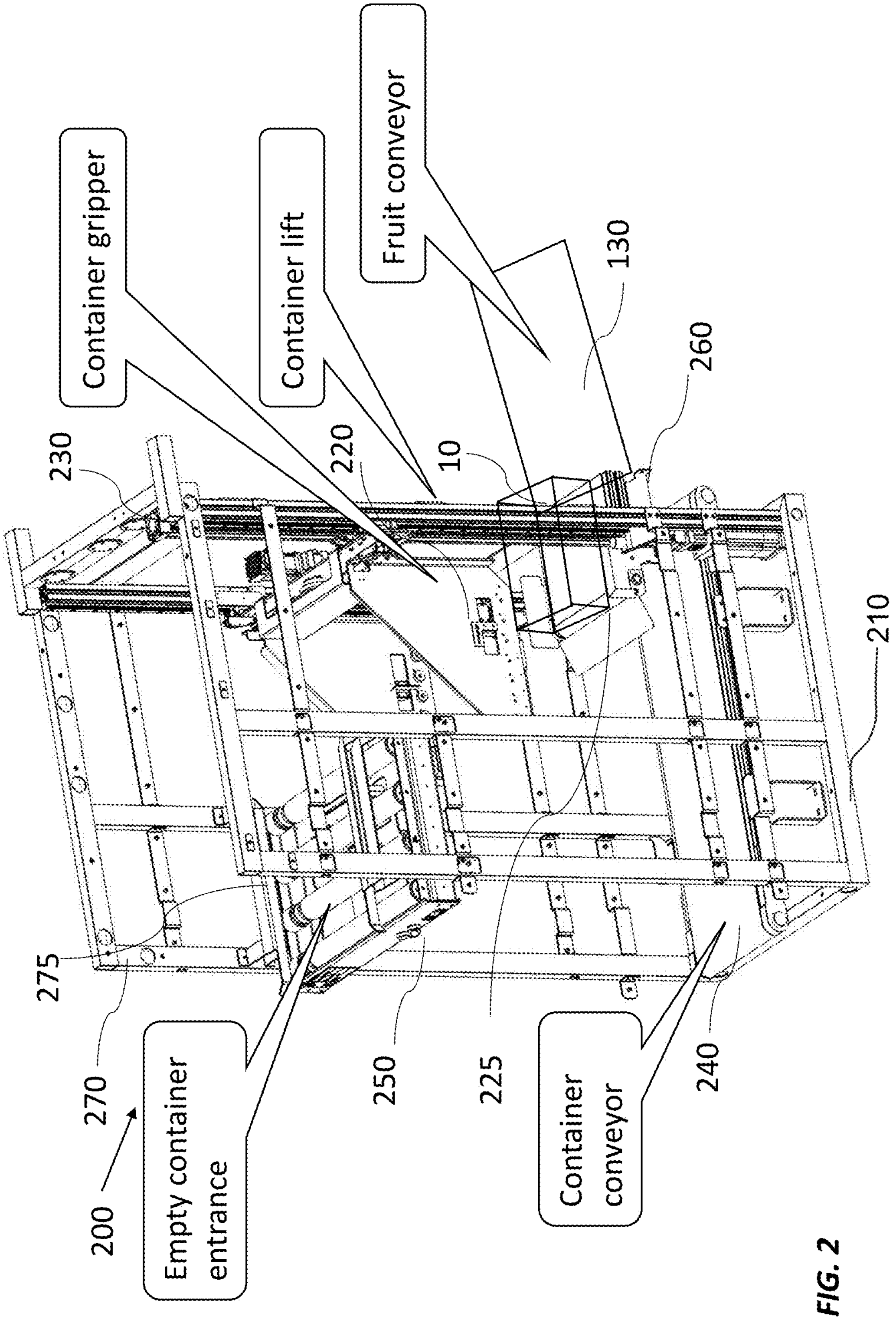
FIG. 2 is an illustration of a boxing unit according to some embodiments of the invention.
Figure 3A:
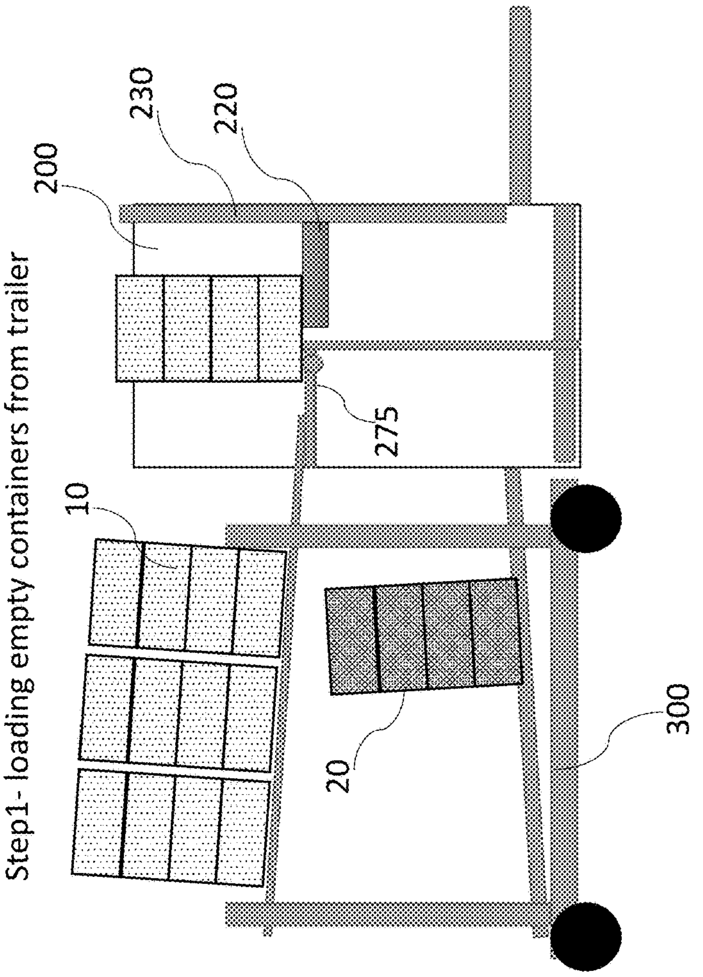
FIGS. 3A-3H are illustrations of various steps of a boxing process according to some embodiments of the invention.
Figure 3B:
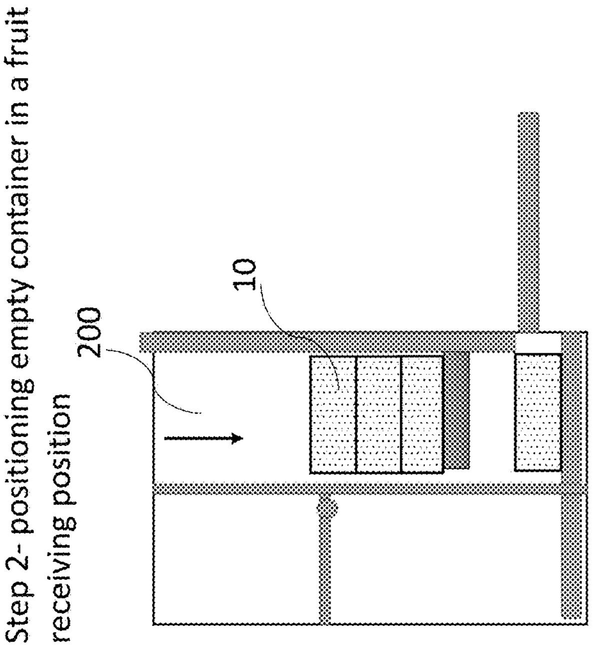
Figure 3C:
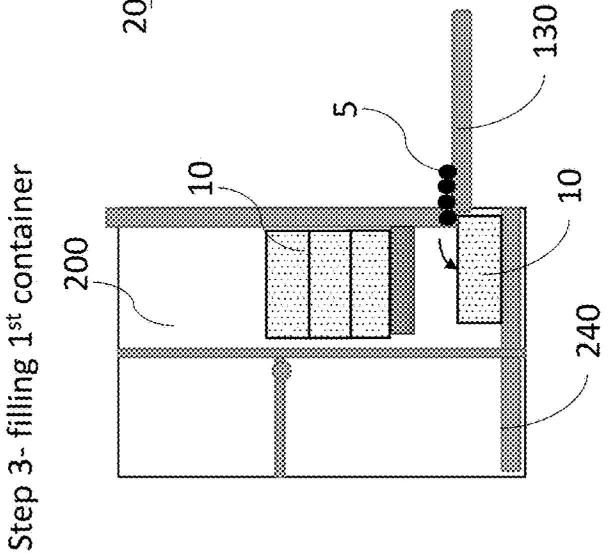
Figure 3D:
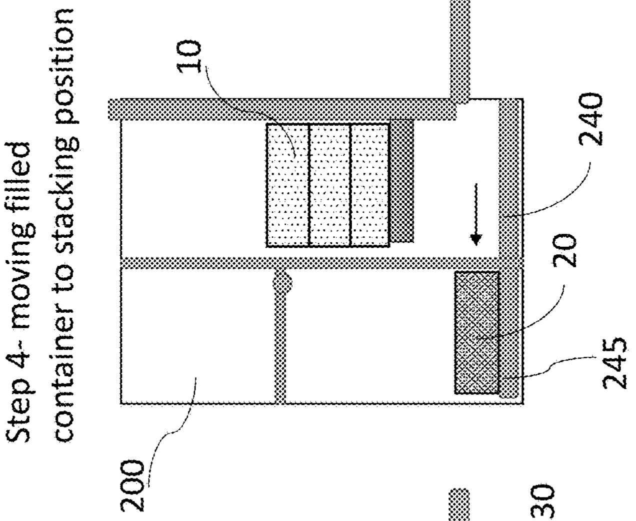
Figure 3E:
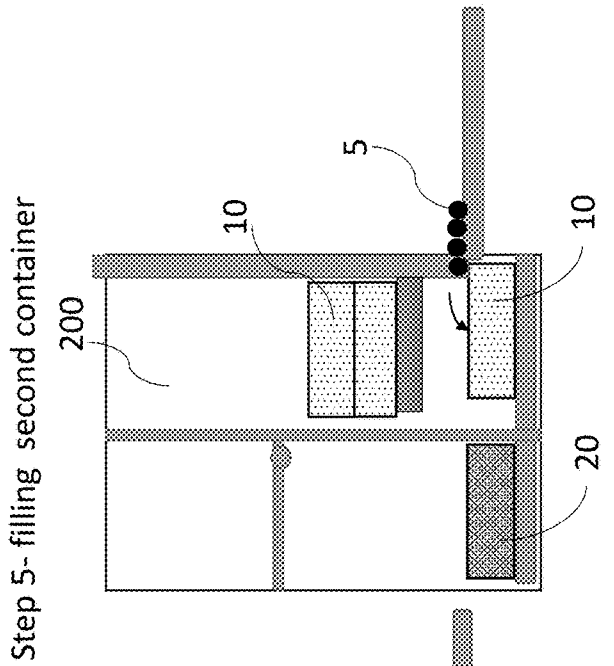
Figure 3F:
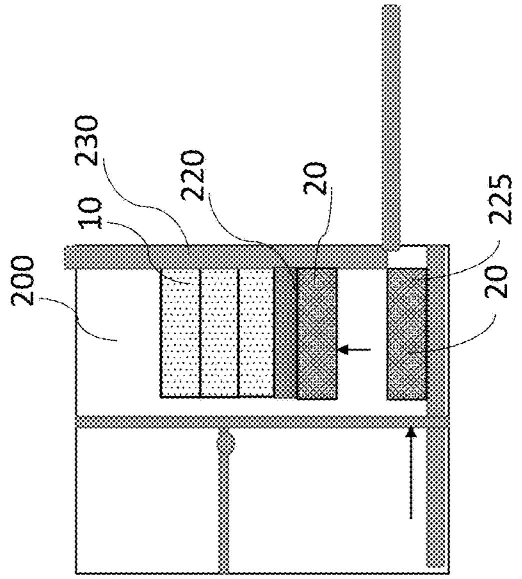
Figure 3G:
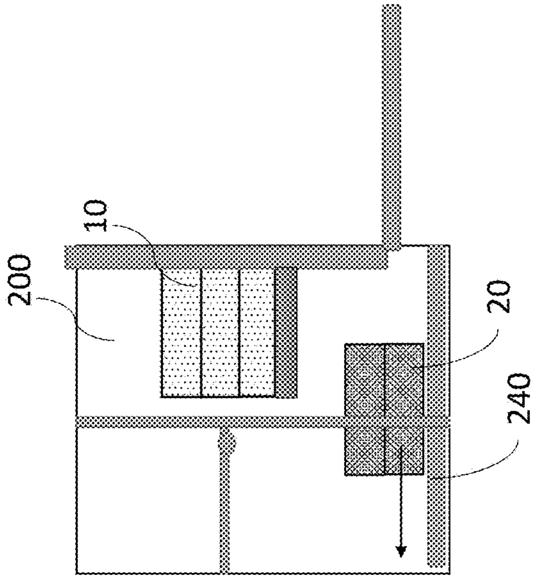
Figure 3H:
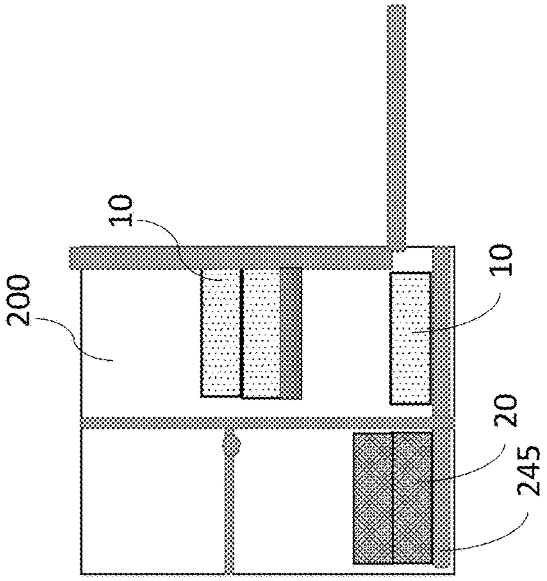

Reference is now made to FIG. 2 which is a detailed illustration of movable boxing unit 200 according to some embodiments of the invention. In some embodiments, second movable platform 210 may include at least four wheels (e.g., railway wheels and car wheels) that may be configured to travel on at least one of: rails and trails. In some embodiments, second movable platform 210 may be configured to be pulled by picking unit 100 (e.g., using steering and driving unit 150). Alternatively, second movable platform 210 may include an independent steering and driving unit (e.g., similar to steering and driving unit 150).

In some embodiments, containers' gripper 220 may include any device allowing to grip a single container 10 from a stack of containers 10 and secure container 10 in fruit receiving position 225. For example, gripper 220 may include a servo motor gear and sensors, attached to an adjustable open and close mechanism that can hold or support the stack of containers 10. In some embodiments, gripper 220 may further use rollers for loading and unloading containers 10 from the conveyor 240. In some embodiments, containers' lift 230 may include any lifting device/unit configured to lift one or more containers. Containers' lift 230 may lift empty or full containers. Containers' lift 230 may include an electric motor and gear and a linear actuator.

In some embodiments, containers' lift 230 may include a brake system for holding the lift in position to avoid the unsafe drop and save energy while not in movement.

In some embodiments, container's conveyor 240 may include a conveying belt and a rolling unit for rolling the conveying belt. In some embodiments, container's conveyor 240 may be configured to convey container 10 from fruit receiving position 225 to the stacking positions, as illustrated and discussed in detail with respect to FIGS. 3A-3H.

In some embodiments, movable picking unit 100 (illustrated in FIG. 1) and movable boxing unit 200 may be connected via a connector 260 such that a fruit placed on fruit conveyor 120 will fall into container 10 positioned at fruit receiving position 225. Alternatively, first movable platform 110 and second movable platform 210 may be the same movable platform, and container's conveyor 240 and fruit conveyor 130 are assembled are the same platform such that a fruit placed on fruit conveyor 130 will fall into container 10 positioned at the fruit receiving position 225.

In some embodiments, container's gripper 220 and container's lift 230 may be held inside an open frame 270, as illustrated. Open frame 270 may include an empty container entrance shelf 275 located at the upper portion of the open frame, for receiving empty containers 10. For example, entrance shelf 275 may be configured to direct empty containers 10 towards lift 230.

In some embodiments, the one or more controllers (e.g., controller 160) may be configured to control at least one of: steering and driving unit 150 of first movable platform 110, a steering and driving unit of second movable platform 210, the one or more robotic arms 220, fruit conveyor 130, container's conveyor 240 and containers lift 230. In some embodiments, system 1000 may further include one or more cameras located at fruit picking unit 100 for capturing one or more images of fruits on the plant. In some embodiments wherein the controller may be configured to: receive images of fruits; determine one or more fruits to be picked, and control one or more robotic arms 120 to pick the one or more fruits.

In some embodiments, the system may further include a power supply trolley (not illustrated) electrically connected to at least one of: the picking unit and the boxing unit for providing electricity to components and units of the picking unit and the boxing unit. The power supply trolley may include one or more rechargeable batteries. The power supply trolley may be configured to travel on either rails or trails following picking unit 100 and/or boxing unit 200 providing electric power to the units. In some embodiments, at least one of picking unit 100 and/or boxing unit 200 may include an on-board battery and the power supply trolley may recharge the onboard battery(s).

In some embodiments, once discharged, the power supply trolley may easily be disconnected from picking unit 100 and/or boxing unit 200 to be replaced with a recharged power supply trolley. This may be done automatically or manually. The power supply trolley may extend the working hours to system 1000 dramatically. In an automatic mode, a discharged power supply trolley may disconnect from system 1000 and may travel to a docking station for recharging. Once recharged, the power supply trolley may autonomously travel to a "connecting position" (e.g., an end of a planted line) to be reconnected to system 1000 upon request. In some embodiments, the power supply trolley may further include a conveyor for providing empty containers 10 for boxing unit 200 and for receiving full containers from boxing unit 200, as illustrated and discussed with respect to trolley 300 in FIG. 3A.

Reference is now made to FIGS. 3A-3H illustrating several steps in a method of picking and boxing fruits according to some embodiments of the invention. The method may be performed by system 1000. In step 1 (FIG. 3A), empty containers 10 may be loaded from a trolley 300. Trolley 300 may include one or more containers conveyors for conveying empty containers 10 to lift 230 for receiving full containers 20 from lift 230. Trolly 300 may further include one or more rechargeable batteries for providing electric power to system 1000. The loading may be conducted automatically or manually. Empty containers 10 may be direct by entrance shelf 275 into lift 230 such that the lower container 10 is gripped by gripper 220. In step 2 (FIG. 3B), a first empty container 10 may be positioned in fruit receiving position 225.

In step 3 (FIG. 3C) fruits or bunches 5 may be conveyed by fruit conveyor 120 to be automatically boxed inside first empty container 10. In step 4 (FIG. 3D) a first full container 20 may be conveyed by containers conveyor 240 to a stacking position 245. In step 5 (FIG. 3E), a second empty container 10 may be positioned in fruit receiving position 225 to be filled with fruits or bunches 5. In step 6 (FIGS. 3F-3H) a second full container 20 may be stacked above the first full container. For example, gripper 220 may grip second full container 20 allowing lift 230 to lift second full container 20. Container's conveyor 240 may then place first full container 20 in position 225. Gripper 220 and lift 230 may place second full container 20 on top of first full container 20. Container's conveyor 240 may then convey the stacked first and second full container 20 to stacking position 245.

Steps 2-6 may be repeated until at least some of the empty containers received from trailer 300 are filled with fruits or bunches.

Some additional aspects of the invention may be directed to a steering and driving unit for a system for picking fruits. Such a system for steering and driving unit may be configured to autonomously drive a system such as system 1000 or a system such as unit 100 in a greenhouse and/or on the field.

In some embodiments, system/unit for picking fruits 100 may include: a first movable platform 110, one or more robotic arms 120 connected to movable platform 110 and a fruit conveyor 130, as discussed hereinabove with respect to FIG. 1. In some embodiments, movable platform 110 may at least four wheels 115 (e.g., railway wheels and car wheels) may be configured to travel on at least one of: rails and trails. Movable platform 110 may further include a steering and driving unit 150, illustrated in detail in FIG. 5.

Figure 5:
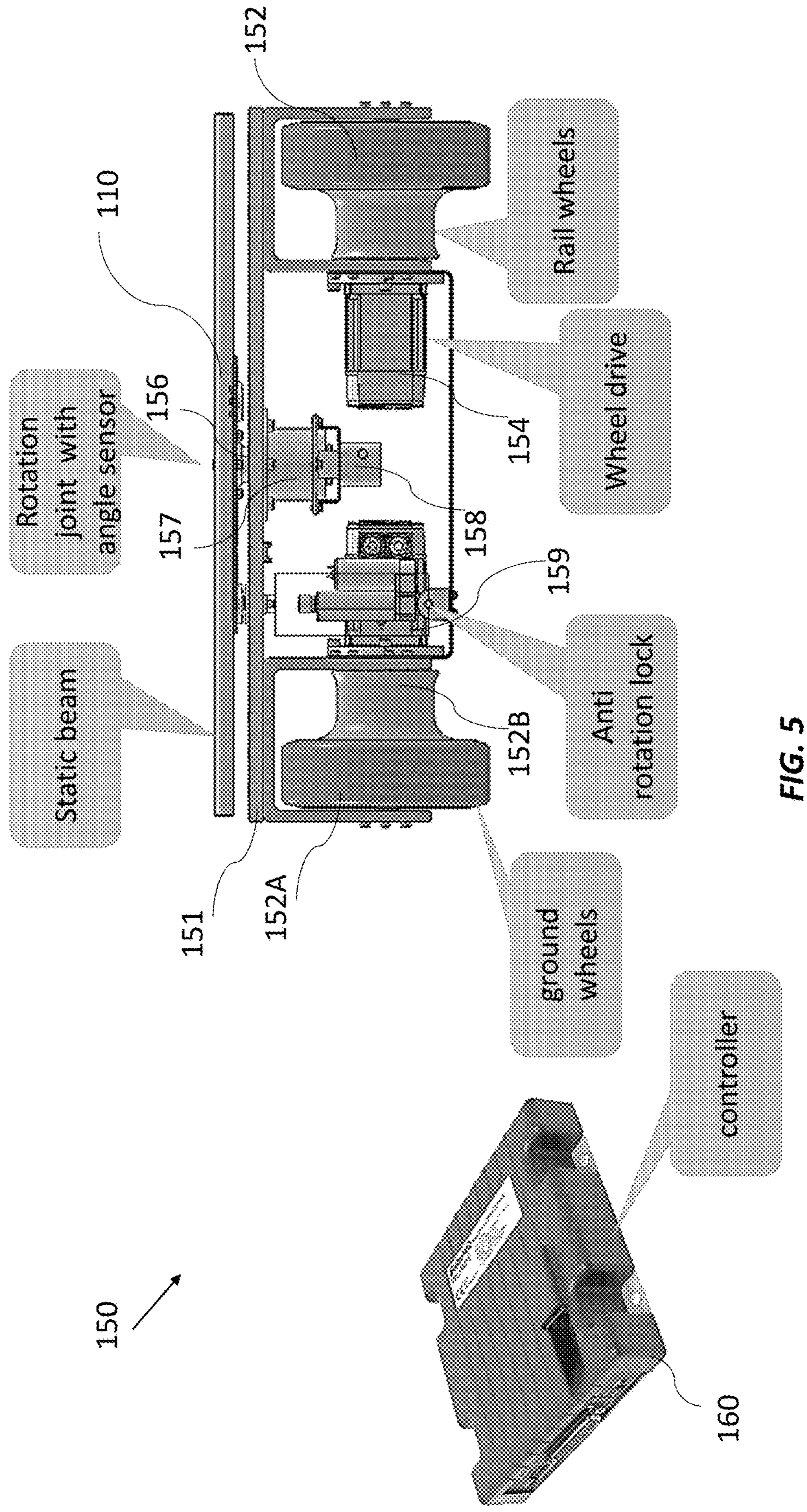
FIG. 5 is an illustration of a steering and driving unit according to some embodiments of the invention.

Reference is now made to FIG. 5 which is an illustration of steering and driving unit 150 according to some embodiments of the invention. Steering and driving unit 150 may include: a chassis 151, two wheels 152 pivotally connected to chassis 151 and at least one driving motor 154 coupled to at least one wheel 152. In some embodiments, wheels 152 may be configured to travel on both a trail and a rail. For example, each one of wheels 152 may include a first wheel 152A configured to travel on a trail and a second wheel 152B configured to travel on a rail. In some embodiments, steering and driving unit 150 may further include a rotating joint 156 pivotally connecting chassis 151 to platform 110 and a rotating motor 157 coupled to rotating joint 156 and configured to rotate steering and driving unit 150 with respect to platform 110. In some embodiments, once steered to a required rotation position, steering and driving unit 150 may be secured to platform 110 by a securing element 159.

In some embodiments, rotating joint 156 may include an axle and at least one bearing. In some embodiments, releasing of the electrical lock of rotating motor 157 may allow the wheel 252 to rotate the shaft (while the vehicle stays static). In some embodiments, a sensor 158 may measure the position of the axle, using the electrical lock mechanism of motor 157 at the required orientation. In some embodiments, as the axle is locking the differential movement of driving wheels 252 may turn unit 100. In some embodiments, wheels 115 of unit 100 may self-adjust their orientation according to the orientation driving wheels 252. In some embodiments, at least one driving motor 154 and rotating motor 157 may be electric motors (e.g., servo motors). In some embodiments, the axle rotation may also be determined by a separate motor controlling the axle orientation. In some embodiments, securing element 159 may include [linear actuator, with a lock pin, the lock pin may be inserted to a sleeve attached to platform 110 and prevent movement of between the axle and platform 110.

In some embodiments, system/unit 100 may further include a controller 160 configured to control steering and driving unit 150 to at least one of: (1) drive system/unit 100 (or system 1000) to travel along a trail, (2) drive system/unit 100 (or system 1000) to travel along a railway, (3) change a driving direction of system/unit 100 (or system 1000) at a zero turning radius. For example, controller 160 may control driving motor 154 to rotate wheels 152 when system/unit 100 (or system 1000) is traveling one either trail or railway, during the picking of fruits from planted lines. In another example, controller 160 may control rotating motor 157 to pivotally rotate steering and driving unit 150 in 90 degrees, thus changing the driving direction of wheels 152. Therefore, upon providing power to driving motor 154, unit 150 may drive system/unit 100 (or system 1000) perpendicular to the direction of the planted line/trail, for example, at an end of the planted line. In some embodiments, wheels 115 may also be configured to rotate following the rotation of unit 150. In some embodiments, controller 160 may further control securing element 159 to secure unit 150 on the new rotation position.

In some embodiments, steering and driving unit 150 may be symmetrically located at the middle bottom part of platform 110.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. An autonomous system for automatic picking and boxing of fruits, comprising:
- a movable picking unit, comprising:
  - a first movable platform;
  - one or more robotic arms connected to the movable platform; and
  - a fruit conveyor,
- wherein the first movable platform further comprises:
  - a platform;
  - at least four wheels; and
  - a steering and driving unit, comprising:
    - a chassis:
    - two wheels pivotally connected to the chassis;
    - at least one driving motor coupled to at least one wheel;
    - a rotating joint pivotally connecting the chassis to the platform;
    - a rotating motor coupled to the rotating joint and configured to rotate the steering and driving unit with respect to the platform; and
    - a securing element for securing the steering and driving unit to the platform at any rotation position,
  - wherein each robotic arm is configured to pick at least one fruit at a time and place the at least one picked fruit on the fruit conveyor; and
- a movable boxing unit, comprising:
  - a second movable platform;
  - a containers' gripper;
  - a containers' lift; and
  - a container's conveyor,
- wherein the container's conveyor is configured to receive a container from the containers' gripper and convey the container to a fruit receiving position, at which the container receives fruits from the fruit conveyor, and
- wherein each one of the at least four wheels and the two wheels pivotally connected to the chassis is configured to travel on both a trail and a rail.

2. The system of claim 1, wherein the movable picking unit and the movable boxing unit are connected via a connector such that a fruit placed on the fruit conveyor will fall into a container positioned at the fruit receiving position.

3. The system of claim 1, wherein the first movable platform and the second movable platform are the same movable platform, and the container's conveyor and the fruit conveyor are assembled on the moveable platform such that a fruit placed on the fruit conveyor will fall into a container positioned at the fruit receiving position.

4. The system of claim 1, wherein the containers' gripper and the containers' lift are held inside an open frame.

5. The system of claim 3, wherein the movable boxing unit further comprises an empty container entrance shelf located at an upper portion of an open frame.

6. The system of claim 1, further comprising a controller configured to control at least one of: the first movable platform, the second movable platform, the one or more robotic arms, the fruit conveyor, the container's conveyor and the containers' lift.

7. The system of claim 5, further comprising one or more cameras for capturing one or more images of fruits on plant and wherein the controller is configured to:
- receive images of fruits;
- determine one or more fruits to be picked; and
- control the one or more robotic arms to pick the one or more fruits.

8. The system of claim 1, having a maximum length of 200 cm and a maximum height of 200 cm.

9. The system of claim 1, wherein the first movable platform and the second movable platform are configured to travel on at least one of: rails and trails.

10. The system of claim 9, wherein the first movable platform and the second movable platform comprise at least one of: railway wheels and wheels.

11. A system for picking fruits comprising:

a first movable platform;

one or more robotic arms connected to the first movable platform; and a fruit conveyor, wherein each robotic arm is configured to pick at least one fruit at a time and place the at least one picked fruit on the fruit conveyor, and wherein the first movable platform comprises:

a platform;

at least four wheels; and a steering and driving unit, comprising:

a chassis;

two wheels pivotally connected to the chassis;

at least one driving motor coupled to at least one wheel;

a rotating joint pivotally connecting the chassis to the platform;

a rotating motor coupled to the rotating joint and configured to rotate the steering and driving unit with respect to the platform; and a securing element for securing the steering and driving unit to the platform at any rotation position, and wherein the steering and driving unit are symmetrically located at a middle bottom part of the platform.

12. The system of claim 11, wherein each one of the at least four wheels and the two wheels pivotally connected to the chassis is configured to travel on both a trail and a rail.

13. The system of claim 12, wherein each wheel includes a first wheel configured to travel on a trail and a second wheel configured to travel on a rail.

14. The system of claim 11, further comprising a controller configured to a) drive the system to travel along a trail;

b) drive the system to travel along a railway; and c) change a driving direction of the system at a zero turning radius.

15. The system of claim 14, wherein the controller is configured to control at least one of: control the steering and driving unit to control at least one of: the at least one driving motor, the rotating motor and the securing element.

16. A system for picking fruits comprising:

a first movable platform;

one or more robotic arms connected to the first movable platform; and a fruit conveyor, wherein each robotic arm is configured to pick at least one fruit at a time and place the at least one picked fruit on the fruit conveyor, and wherein the first movable platform comprises:

a platform;

at least four wheels; and a steering and driving unit, comprising:

a chassis;

two wheels pivotally connected to the chassis;

at least one driving motor coupled to at least one wheel;

a rotating joint pivotally connecting the chassis to the platform;

a rotating motor coupled to the rotating joint and configured to rotate the steering and driving unit with respect to the platform; and a securing element for securing the steering and driving unit to the platform at any rotation position, and wherein each one of the at least four wheels and the two wheels pivotally connected to the chassis is configured to travel on both a trail and a rail.

* * * * *